O. THOMAS & G. BLACKWELL.
ROLLER GUIDE FOR CHANNELING MACHINES.
APPLICATION FILED FEB. 12, 1915.

1,261,650.

Patented Apr. 2, 1918.
2 SHEETS—SHEET 1.

Witnesses:
Fred S. Overton
Otto M. Holmgren

Inventors
Omer Thomas
Grant Blackwell
By their Attorneys

UNITED STATES PATENT OFFICE.

OMER THOMAS AND GRANT BLACKWELL, OF BEDFORD, INDIANA, ASSIGNORS TO INGERSOLL-RAND COMPANY, OF JERSEY CITY, NEW JERSEY, A CORPORATION OF NEW JERSEY.

ROLLER-GUIDE FOR CHANNELING-MACHINES.

1,261,650.

Specification of Letters Patent.

Patented Apr. 2, 1918.

Application filed February 12, 1915. Serial No. 7,682.

*To all whom it may concern:*

Be it known that we, OMER THOMAS and GRANT BLACKWELL, citizens of the United States, both residing at Bedford, in the county of Lawrence and State of Indiana, have invented a certain new and useful Improvement in Roller-Guides for Channeling-Machines, of which the following is a specification.

This invention relates to stone channeling machines, and more particularly to a guiding mechanism for the drill tool, or gang of steels, used in such channeling machines.

In machines of this type, such as shown, for instance, in the United States Patent to Prellwitz, No. 857,960 dated June 25th, 1907, the cutting tool is composed of a series of "gang" of steels of rectangular cross setion, placed edge to edge, and secured in a chuck which is reciprocated by the engine of the channeling machine, the gang of steels thus forming a cutting tool with an elongated rectangular cross section which cuts a channel in the rock.

The object of this present invention is to provide a guide for the cutting tool which will support the tool against sidewise movement without undue friction and, at the same time, will permit adjustment of the guiding rollers to take up wear on the steels and on the rollers so that the rollers supporting the edges of the steels will at all times be in close and effective contact with the steel.

Figure 1:
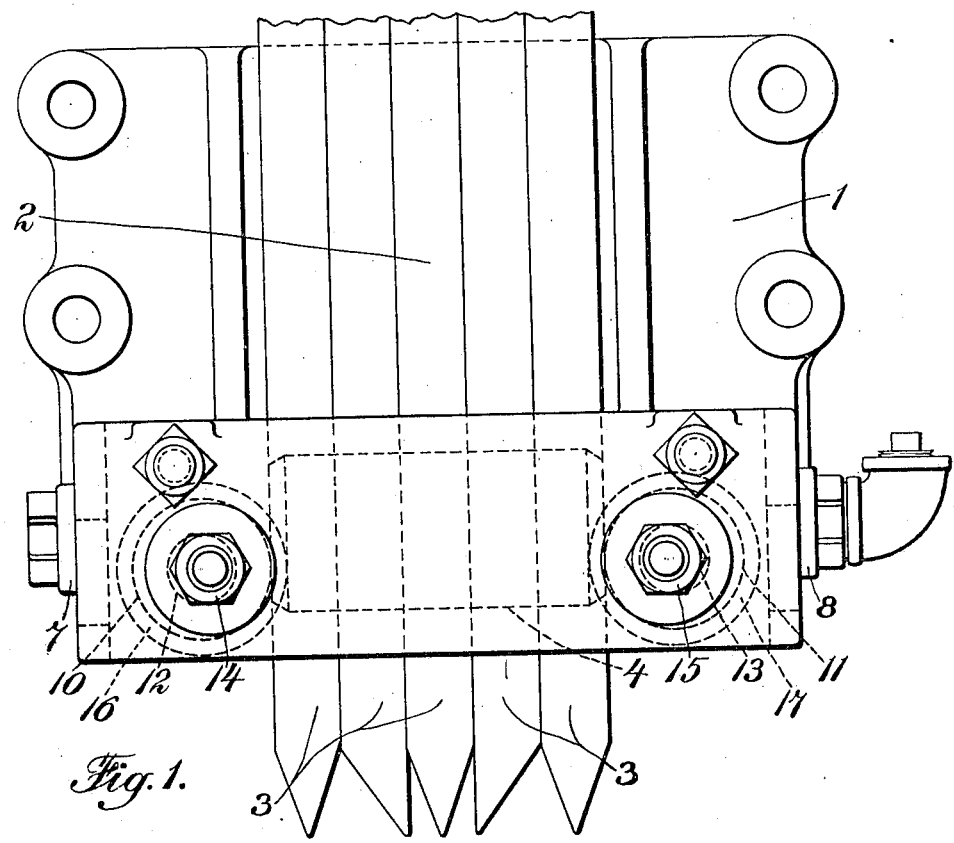
Figure 2:
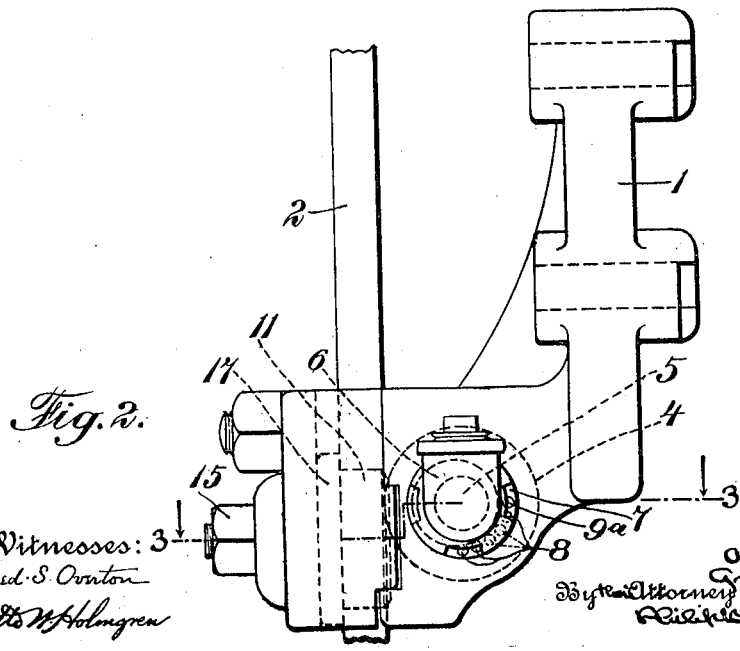
Figure 3:
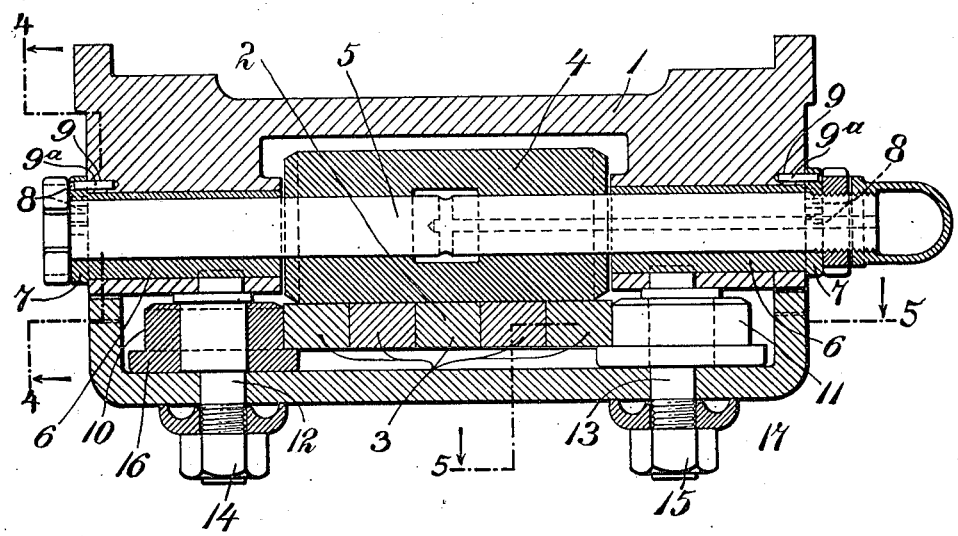
Figure 4:
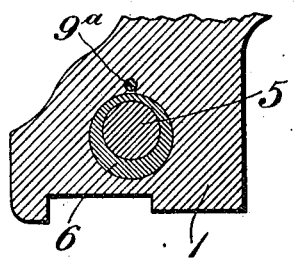
Figure 5:
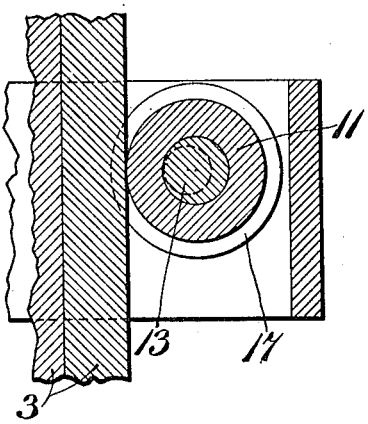

This object has been accomplished by the present invention, a practical embodiment of which is shown in the accompanying drawings, in which Figure 1 shows a front elevation of the guiding mechanism with the gang of steels in place, Fig. 2 shows a side elevation of the guide and steels, Fig. 3 shows a horizontal section on the line 3—3 of Fig. 2, while Figs. 4 and 5 show vertical sections on the lines 4—4 and 5—5 of Fig. 3.

In the drawings is shown only the guiding mechanism, the channeling machine being of the general type shown in the patent to Prellwitz, mentioned above. The guiding mechanism, as shown, comprises a frame 1 vertically mounted in line with the reciprocation of the piston of the channeling engine, to the lower end of which is attached a cutting tool 2 which is made up of a gang of steels 3, which are of rectangular cross section and placed edge to edge, forming a narrow edged cutting tool of considerable width. To support the inner face of the tool is provided a roller 4 which rotates on a shaft 5 set transversely of the guiding frame 1, its axis being parallel with the face of the cutting tool 2. The shaft 5 is journaled in bearing sleeves 6 which are eccentrically bored. These sleeves 6 have flanges 7 in which are series of holes 8, while there is a single hole 9 in each end of the frame. The sleeves 6 can be turned to any desired position and held there by the removable pins 9$^a$ which are inserted through the proper holes 8 into the holes 9, the sleeves 6 being moved around as the roller 4 or the tool 2 wear, so that the roller 4 is always in close contact with the tool 2. At each end of the roller 4, and so positioned as to engage the edges of the tool, are rollers 10 and 11, these rollers 10 and 11 rotating on pins 12 and 13, the axes of which are parallel to the edges of the tool 2, but perpendicular to the axis of the shaft 5. The positions of the pins 12 and 13 on which the rollers 10 and 11 rotate are eccentric to the main axes of the pins 12 and 13, so that by loosening the nuts 14 and 15 which determine the angular position of the pins 12 and 13, the rollers 10 and 11 can be moved toward or away from the edges of the tool 2 to take up wear, and always maintain the rollers 10 and 11 in close contact with the edges of the tool. The outer faces of the rollers 10 and 11 are provided with flanges 16 and 17 of larger diameter than the portions of the rollers which contact with the edges of the tool, these flanges 16 and 17 engaging the outer faces of the steel 3 forming the edge portions of the tool.

The operation of the guiding mechanism will be evident from the above description, the advantages of this guiding mechanism being that the tool can be always supported securely against edgewise movement, no matter what the condition of wear of the steel and the rollers may be.

It is to be understood that while the present showing and description discloses only one specified modification of the invention, other forms and modifications are included in the spirit and scope of the same, as expressed in the appended claims.

What we claim is:

1. In a roller guide for the cutting steels of channeling machines, a guiding frame, a roller in said frame adapted to form a bearing surface for one of the flat faces of a gang of steels, and rollers forming bearing surfaces for the edges of said gang of steels, said rollers rotating on axes at right angles to the axis of said first mentioned roller and having flanges on their outer edges to engage the other face of the steels forming the edges of said gang of steels.

2. In a roller guide for the cutting steels of channeling machines, a guiding frame, a roller in said frame adapted to form a bearing surface for one of the flat faces of a gang of steels, and rollers forming bearing surfaces for the edges of said gang of steels, said rollers rotating on axes at right angles to the axis of said first mentioned roller and having flanges on their outer edges to engage the other face of the steels forming the edges of said gang of steels, each of said rollers being eccentrically mounted to provide adjustment for wear upon three sides of the cutting steels.

3. In a roller guide for the cutting steels of channeling machines, a guiding frame, a roller in said frame adapted to form a bearing surface for one of the flat faces of a gang of steels, said roller mounted upon a shaft passing through eccentric sleeves whereby said shaft and roller may be adjusted toward and from said cutting steels, said eccentric sleeves having flanges and pins passing through said flanges to hold said eccentric sleeves in any adjusted position and rollers rotating on axes at right angles to said first mentioned roller having flanges on their outer edges to engage the other face of the steels forming the edge of the gang of steels.

In testimony whereof, we have hereunto set our hands.

OMER THOMAS.
GRANT BLACKWELL.

Witnesses:
HARRY BLACKWELL,
HENRY WINTERHALTER.

Copies of this patent may be obtained for five cents each, by addressing the "Commissioner of Patents, Washington, D. C."